United States Patent
Shimizu

(10) Patent No.: US 7,603,558 B2
(45) Date of Patent: Oct. 13, 2009

(54) MONTGOMERY TRANSFORM DEVICE, ARITHMETIC DEVICE, IC CARD, ENCRYPTION DEVICE, DECRYPTION DEVICE AND PROGRAM

(75) Inventor: Hideo Shimizu, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 791 days.

(21) Appl. No.: 11/151,289

(22) Filed: Jun. 14, 2005

(65) Prior Publication Data
US 2006/0126830 A1    Jun. 15, 2006

(30) Foreign Application Priority Data
Nov. 19, 2004    (JP) .............................. 2004-336047

(51) Int. Cl.
*H04L 9/32*    (2006.01)
(52) U.S. Cl. ........................................ 713/174; 380/28
(58) Field of Classification Search ........................ None
See application file for complete search history.

(56) References Cited

U.S. PATENT DOCUMENTS

| 7,240,204 B1 * | 7/2007 | Koc et al. ................... 713/174 |
| 2006/0059220 A1 * | 3/2006 | Koshy et al. ................ 708/491 |

OTHER PUBLICATIONS

MENEZES, A. J. et al., "Handbook of Applied Cryptography," CRC Press, Section 14, pp. 600-613, (1997).

* cited by examiner

*Primary Examiner*—Brandon S Hoffman
(74) *Attorney, Agent, or Firm*—Finnegan, Henderson, Farabow, Garrett & Dunner, L.L.P.

(57) ABSTRACT

According to an aspect of the invention, Montgomery arithmetic can be achieved while omitting division in an input stage. That is, the aspect of the invention is configured to obtain a Montgomery transform result m' (=mR mod p) of n-bit from an input m of 2n-bit without using the division, with using Montgomery reduction and Montgomery multiplication instead of conventional mod arithmetic and the Montgomery transform. Accordingly, Montgomery arithmetic can be achieved while omitting the division in the input stage.

14 Claims, 8 Drawing Sheets

MONTGOMERY TRANSFORM DEVICE, ARITHMETIC DEVICE, IC CARD, ENCRYPTION DEVICE, DECRYPTION DEVICE AND PROGRAM

CROSS-REFERENCE TO RELATED APPLICATIONS

This application is based upon and claims the benefit of priority from prior Japanese Patent Application No. 2004-336047, filed Nov. 19, 2004, the entire contents of which are incorporated herein by reference.

BACKGROUND OF THE INVENTION

The present invention relates to a Montgomery transform device, an arithmetic device, an IC card, an encryption device, a decryption device and a program which are small-sized and capable of being incorporated in an IC card (smart card).

A public key encryption system is one of the most important techniques among encryption techniques. An encryption system, for example, Rivest-Shamir-Adleman (RSA) encryption, a digital signature algorithm (DSA) signature and the like have been widely used. In recent years, a public key encryption system has become able to execute the RSA signature on the IC card; then, the application field of security has spread. However, a usual IC card has a CPU with a low performance, so that a single CPU requires too much time for performing signature processing. Therefore, an IC card for encryption additively has an arithmetic device referred to as an encryption accelerator or a coprocessor so as to reduce the time necessary for the signature processing.

A leading public key encryption system is composed of arithmetic calculation on a finite field. An arithmetic object is, for example, a multi-precision integer of 1,024 bits, etc. Here, many arithmetic techniques to make the encryption accelerator miniaturize and accelerate have been developed. An especially important arithmetic technique is a system using the Chinese remainder theorem (CRT) and Montgomery reduction. CRT and Montgomery reduction are described in detail by, for example, A. J. Menezes, P. C. van Oorshot, and S. A. Vanstone, "Handbook of applied cryptography", CRC Press, section 14, etc., (1997).

CRT can execute calculation on a subfield and reduce calculation time by supposing that factorization for a modulus has been already known. In the case of the RSA encryption, since it is assumed that a modulus n can be factorized into two prime numbers p and q, so that a calculation result of mod n (=mod pq) can be calculated on the basis of calculation results of mod p and mod q. In this case, since a whole of intermediate calculation can be done by an extent of almost a half number of digits, a calculation amount is reduced.

Montgomery reduction can calculate a remainder necessary for calculation on the finite filed only by multiplication without division. Generally, division is less advantageous than multiplication in points of a circuit size and an arithmetic speed. Montgomery reduction does not use the division, thereby, advantageous in miniaturization and speeding up. An algorithm in the division calculates a partial quotient when obtaining a remainder. If calculation efficiency for the partial quotient is tried to be enhanced, an error is generated and trial and error such as a re-addition and a re-subtraction are required. This is the reason why the division is disadvantageous.

Both CRT and Montgomery reduction are techniques useful for increasing efficiency and separated with each other, so that it is possible for both CRT and Montgomery reduction can be combined together.

FIG. 1 is a schematic diagram showing a logical configuration to calculate a power remainder by using CRT and Montgomery reduction. The calculation for the power remainder is defined as a content to execute an input m to the d-th power under a modulus pq. In an arithmetic device, mod(remainder calculation) arithmetic units 1 and 2 calculate remainders $m_p$ (=m mod p) and $m_q$ (=m mod q) for an input m of 2n-bit and a power exponent d and obtain remainders $m_p$ and $m_q$ of n-bit, respectively.

Next, for Montgomery transform units 3 and 4 perform the Montgomery transform of the remainders $m_p$ and $m_q$, preparatory for using Montgomery arithmetic and obtain transform results $m_p'$ (=m×$R_p$ mod p) and $m_q'$(=m×$R_q$ mod q), respectively.

At this time, the $R_p$ and the $R_q$ are constants calculated in advance. The constant $R_p$ is the power of 2 larger than the prime number p and a value to make a bit shift instead of the division during Montgomery reduction. In similarity, the constant $R_q$ is the power of 2 larger than the prime number q.

Next, Montgomery power units 5 and 6 calculate power remainders using Montgomery reduction to the transform results $m_p'$ and $m_q'$, respectively, and obtain power remainders $s_p'$ (=$m_p'^{d_p}$×$R_q$ mod p) and $S_q'$ (=$m_q'^{d_q}$×$R_q$ mod q), respectively. However, $d_p$=d mod(p−1) and $d_q$=d mod(q−1). The power exponents $d_p$ and $d_q$ are assumed that they are calculated in advance. A symbol ˆ indicates the power.

Since the power remainders $s_p'$ and $S_q'$ are values on the Montgomery space, they should be returned to values on the finite field. Consequently, Montgomery inverse transform units 7 and 8 perform the Montgomery inverse transform to the power remainders $s_p'$ and $S_q'$ and obtain power remainders $s_p$ (=s mod p) and $s_q$ (=s mod q) on the finite field, respectively.

After this, a CRT arithmetic unit 9 solves simultaneous equations of the $s_p$ (=s mod p) and the $s_q$ (=s mod q) of n-bit on the basis of CRT and obtains s=s mod pq as a solve s of 2n-bit. This solve s has become a power remainder s=$m^d$ mod pq of a final result.

Power remainder calculation has just completed as mentioned above. In practice, the prime numbers p and q are set to around 512 bits and the input m is set to around 1,024 bits to assure security.

However, such an arithmetic device described above requires remainder calculation (mod arithmetic) for reducing the number of bits in an input stage so as to combine CRT and Montgomery arithmetic.

The reason of the necessity of the remainder calculation is considered that the Montgomery transform units 3 and 4 accept the inputs $m_p$ and $m_q$ of n-bit but do not accept the input m of 2n-bit. However, the remainder calculation requires the division to obtain a remainder. As stated above, the division is disadvantageous in the points of the circuit size and the arithmetic speed.

BRIEF SUMMARY OF THE INVENTION

An object of the invention is to provide a Montgomery transform device and a program for achieving Montgomery arithmetic while omitting division in an input stage.

Another object of the invention is to provide an arithmetic device, an IC card, an encryption device, a decryption device and a program, which can execute power remainder calculation with CRT and Montgomery arithmetic are combined therein while omitting the division in the input stage.

According to a first aspect of the present invention, there is provided a Montgomery transform device for obtaining a Montgomery transform result m' (=mR mod p) of n-bit from an input m of 2n-bit on the basis of a multiplier R not less than n-bit and a modulus p of n-bit, comprising: a Montgomery reduction device configured to execute the Montgomery reduction composed of multiplication, addition and a bit shift to the input m of 2n-bit on the basis of the modulus p and the multiplier R and obtain a Montgomery reduction result ($mR^{-1}$ mod p) of n-bit; and a Montgomery multiplication device configured to execute the Montgomery multiplication of the Montgomery reduction result ($mR^{-1}$ mod p) by the cube of the multiplier R ($R^3$ mod p) on the basis of the multiplier R and the modulus p and output the obtained Montgomery multiplication result (mR mod p) of n-bit as the m' (=mR mod p).

According to a second aspect of the present invention, there is provided an arithmetic device for calculating the d-th power under a modulus pq to an input m of 2n-bit on the basis of multipliers $R_p$ and $R_q$ not less than n-bit, moduli p and q of n-bit and a power exponent d of n-bit to obtain a power remainder s (=$m^d$ mod pq) of n-bit, comprising: a first Montgomery reduction device configured to execute the Montgomery reduction composed of multiplication, addition and a shift to the input m of 2n-bit on the basis of the multiplier $R_p$ and the modulus p and obtain a first Montgomery reduction result ($mR_p^{-1}$ mod p) of n-bit; and a first Montgomery multiplication device configured to execute the Montgomery multiplication of the first Montgomery reduction result by the cube of the multiplier $R_p$ ($R_p^3$ mod p) on the basis of the multiplier $R_p$ and the modulus p and obtain a first Montgomery multiplication result $m_p'$ (=$mR_p$ mod p); a first Montgomery power device configured to perform the $d_p$-th power of the first Montgomery multiplication result $m_p'$ [however, $d_p$=d mod(p−1)] on the basis of the power exponent d, the multiplier $R_p$ and the modulus p and obtain a first power remainder $s_p'$ (=$m_p'^{d_p} \times R_p$ mod p) of n-bit; a first Montgomery inverse transform device configured to execute the Montgomery inverse transform to the first power remainder $s_p'$ on the basis of the multiplier $R_p$ and the modulus p and obtain a first Montgomery inverse transform result $s_p$ (=$m^d$ mod p) of n-bit; a second Montgomery reduction device configured to execute the Montgomery reduction to the input m on the basis of the multiplier $R_q$ and the modulus q and obtain a second Montgomery reduction result ($mR_q^{-1}$ mod q) of n-bit; a second Montgomery multiplication device configured to execute the Montgomery multiplication of the second Montgomery reduction result by the cube of the multiplier $R_q$ ($R_q^3$ mod q) on the basis of the multiplier $R_q$ and the modulus q and obtain a second Montgomery multiplication result $m_q'$ (=$mR_q$ mod q) of n-bit; a second Montgomery power device configured to perform the $d_q$-th power of the second Montgomery multiplication result $m_q'$ of n-bit [however, $d_q$=d mod (q−1)] on the basis of the power exponent d, the multiplier $R_q$ and the modulus q and obtain a second power remainder $s_q'$ (=$m_q'^{d_q} \times R_q$ mod q) of n-bit; a second Montgomery inverse transform device configured to execute the Montgomery inverse transform to the second power remainder $s_q'$ on the basis of the multiplier $R_q$ and the modulus q and obtain a second Montgomery inverse transform result $s_q$ (=$m^d$ mod q) of n-bit; and a simultaneous equations solution device configured to solve simultaneous equations of the first Montgomery inverse transform result $s_p$ and the second Montgomery inverse transform result $s_q$ on the basis of the moduli p, q and the Chinese remainder theorem (CRT) and output the obtained solution ($m^d$ mod pq) of n-bit as the power remainder s.

The arithmetic device in the second aspect of the invention may be mounted on an arbitrary device such as the IC card, the encryption device and the decryption device and used for power arithmetic.

The first aspect of the invention is configured to obtain a Montgomery transform result of n-bit from an input m of 2n-bit by Montgomery reduction and Montgomery multiplication composed of multiplication, addition and a bit shift instead of conventional mod arithmetic and Montgomery multiplication and nor using the division. Consequently, the first aspect can achieve Montgomery arithmetic while omitting the division in the input stage.

In similarity, the second aspect has the configuration of the first aspect in an input stage of power remainder calculation using CRT, thereby, power remainder calculation with CRT and Montgomery arithmetic are combined therein can be executed while omitting the division in the input stage.

DETAILED DESCRIPTION OF THE INVENTION

Figure 1:
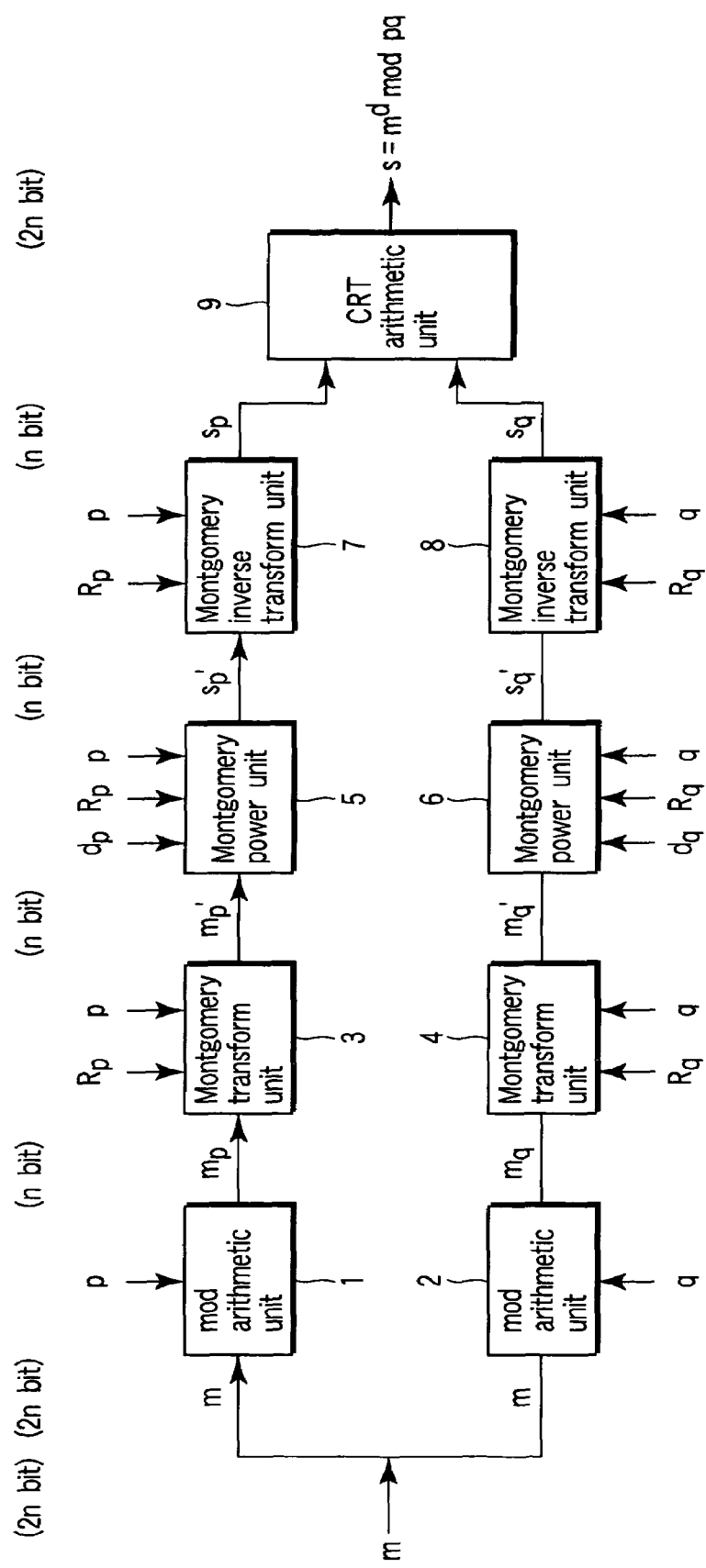
FIG. 1 is a schematic diagram showing a logical configuration of a conventional arithmetic device.

Hereinafter, each embodiment of the invention will be explained by referring to the drawings.

First Embodiment

Figure 2:
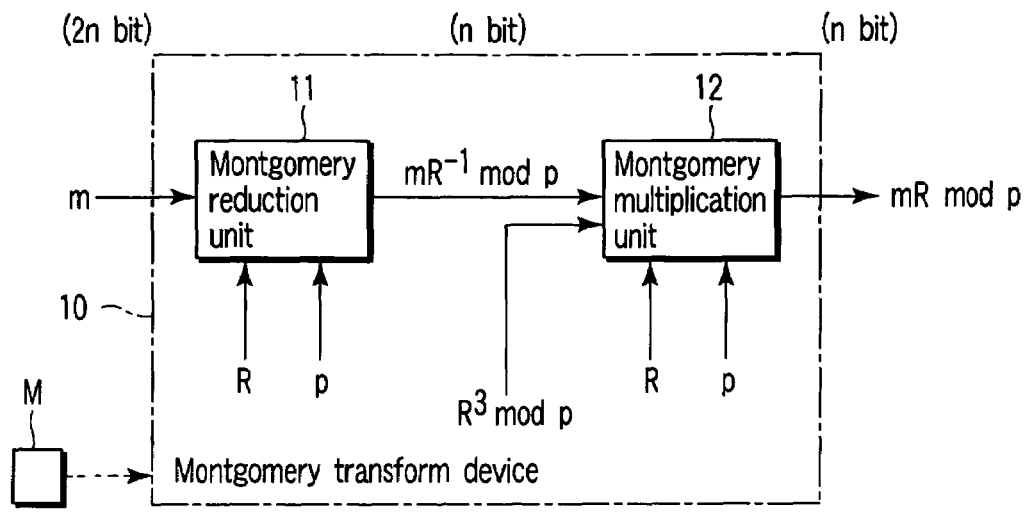
FIG. 2 is a schematic diagram showing a configuration of a Montgomery transform device regarding a first embodiment of the invention.

FIG. 2 is the schematic diagram showing the configuration of the Montgomery transform device regarding the first embodiment of the invention, the same parts as those of FIG. 1 are given the same symbols, the same parts will be omitted to be explained in detail, and different parts will be mainly explained here. Similarly, the following respective embodiment will not be explained redundantly.

That is, the first embodiment has a Montgomery transform device 10 for obtaining a Montgomery transform result m' (=mR mod p) of n-bit from an input m of 2n-bit without using the division, contrary to a conventional mod arithmetic unit 1 and a Montgomery transform unit 3.

The Montgomery transform device 10 can be realized by a hardware configuration or even by a combination of a hardware configuration and a software configuration. In the latter case, the software configuration is achieved by installing a program acquired from a computer readable storage medium M or a network into a computer of the Montgomery transform device 10. This program is one to realize functions of a Montgomery reduction unit 11 and a Montgomery multiplication unit 12 by the computer of the Montgomery transform device 10. Each device such as an arithmetic device 13, an IC card 20, an encryption device 20E and a decryption device 20D which will be described in the following each embodiment can be similarly realized.

Where, the Montgomery transform device 10 has the Montgomery reduction unit 11 and the Montgomery multiplication unit 12.

The Montgomery reduction unit 11 calculates the Montgomery reduction of the input m of 2n-bit on the basis of a multiplier R not less than n-bit and a modulus p of n-bit and outputs the obtained Montgomery reduction result (m×R$^{-1}$ mod p) of n-bit to the Montgomery multiplication unit 12. The Montgomery reduction is arithmetic which is composed of multiplication, addition and a bit shift and does not use division. The Montgomery reduction is described, for example, in A. J. Menezes, P. C. van Oorshot, and S. A. Vanstone, "Handbook of applied cryptography", CRC Press, section 14, etc., (1997) (hereinafter, referred to as "Handbook of applied cryptography").

The multiplier R is a constant calculated in advance. The constant R is the power of 2 larger than a prime number p and a value to use the bit shift instead of the division when the Montgomery reduction is used. If the prime number p is a number of 512-bit, the constant is set to $2^{512}$. In the case that a byte shift or a word shift is more efficient than the bit shift, the constant R is selected as a multiple of the number of bits of a byte or a word.

Figure 3:
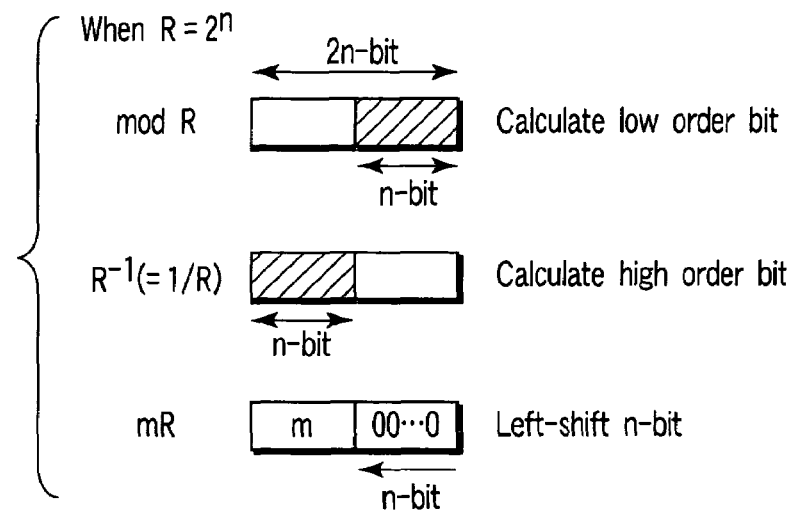
FIG. 3 is a schematic diagram for explaining arithmetic using a multiplier R in the first embodiment.

Arithmetic using the multiplier R is explained here in supplement. When the multiplier R is $2^n$, as shown in FIG. 3, remainder calculation (mod R) is sufficient to calculate a remainder at a n-bit in low order for arithmetic object data of 2n-bit, thereby, the arithmetic is performed easily.

Division (multiplication by R$^{-1}$ or 1/R) needs to make a right shift only by n-bit so as to acquire a n-bit in high order for the arithmetic object data of 2n-bit, so that the arithmetic is facilitated.

Multiplication (mR) needs to make a left shift only by n-bit to the arithmetic object data m, thereby, the arithmetic is easily performed.

The Montgomery multiplication unit 12 has a Montgomery multiplication function executing the Montgomery multiplication of the Montgomery reduction result from the Montgomery reduction unit 11 by the cube of the multiplier R (R$^3$ mod p) on the basis of the multiplier R not less than n-bit and the modulus p of n-bit. The Montgomery multiplication unit 12 outputs the obtained Montgomery multiplication result (m×R mod p) of n-bit as the Montgomery multiplication result m'.

Figure 4:
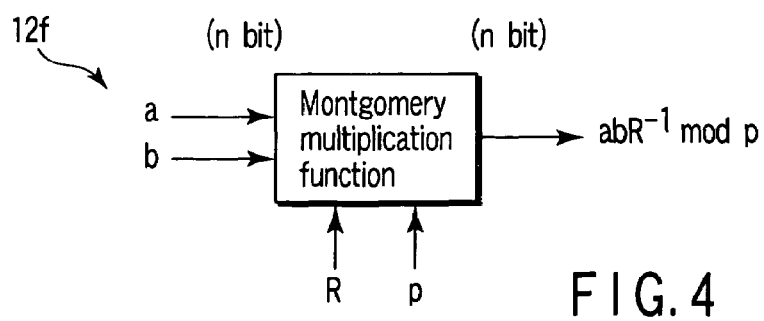
FIG. 4 is a schematic diagram for explaining a general Montgomery multiplication function.
Figure 5:
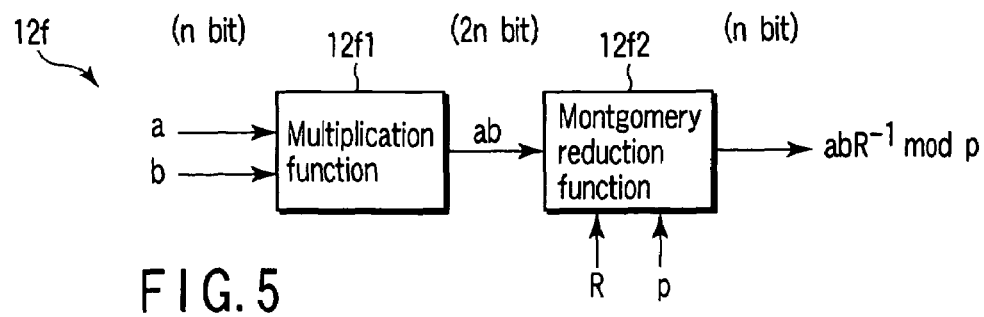
FIG. 5 is a schematic diagram showing a configuration of the general Montgomery multiplication function.

Where, the Montgomery multiplication function is a function 12f for calculating an output a×b×R$^{-1}$ of n-bit from two n-bit inputs a and b, as shown in FIG. 4. Specifically, for example, as shown in FIG. 5, the Montgomery multiplication function 12f can be realized by a configuration composed of a normal multiplication function 12f1 to multiply n-bit inputs a and b with each other and a Montgomery reduction function 12f2 to calculate the Montgomery reduction for a multiplication result a×b.

The cube of the multiplier R (R$^3$ mod p) needs to be calculated, for example, in advance. The cube of the multiplier R (R$^3$ mod p) is by no means limited to this, it is sufficient that the cube of the multiplier R is calculated and stored in advance by calculating and storing the square of the multiplier R (R$^2$ mod p) to be processed by the Montgomery multiplication.

In the case that the square of the multiplier R is needed to be separately stored, a storage area can be saved in comparison with the case that both the cube of the multiplier R (R$^3$ mod p) and the square of the multiplier R (R$^2$ mod p) are required to be stored. However, in the case that the square of the multiplier R is not needed to be stored separately, both ways described above are sufficient for storing the cube of the multiplier R.

Each calculation of the Montgomery reduction and the Montgomery multiplication is described, for example, the "Handbook of applied cryptography" above mentioned.

Next, operations of the Montgomery transform device composed as stated above will be explained. The conventional Montgomery transform unit 3 is, as shown in FIG. 1, receives an input of n-bit. In contrast, the Montgomery transform device 10 in the first embodiment differs in a point that it receives an input of 2n-bit. The operations are sequentially explained as follows.

The Montgomery transform device 10 performs the Montgomery transform for the input m of 2n-bit by means of the Montgomery reduction unit 11. At this time, the Montgomery reduction unit 11 executes the Montgomery reduction for the input m of 2n-bit on the basis of the multiplier R not less than n-bit and the modulus p of n-bit, and outputs the obtained Montgomery reduction result (m×R$^{-1}$ mod p) of n-bit to the Montgomery multiplication unit 12.

In continuance, the Montgomery transform device 10 performs the Montgomery multiplication of the Montgomery reduction result by the multiplier R$^3$ mod p of n-bit is performed by means of the Montgomery multiplication unit 12. At this time, the Montgomery multiplication unit 12 executes the Montgomery multiplication of the Montgomery reduction result by the cube of the multiplier R (R$^3$ mod p), based on the multiplier R of not less that n-bit and the modulus p of n-bit and outputs the Montgomery multiplication result (m×R mod p) of n-bit, as a Montgomery transform result m'.

Thereby, the Montgomery transform device 10 can obtain the Montgomery transform result m' (m×R mod p) of n-bit from the input m of 2n-bit.

According to the first embodiment as stated above, since the configuration obtain the Montgomery transform result of n-bit from the input m of 2n-bit by using the Montgomery reduction and the Montgomery multiplication without having to use division instead of using the conventional arithmetic and the Montgomery transform, the first embodiment can achieve the Montgomery arithmetic while omitting division (mod arithmetic) in the input step.

Figure 6:
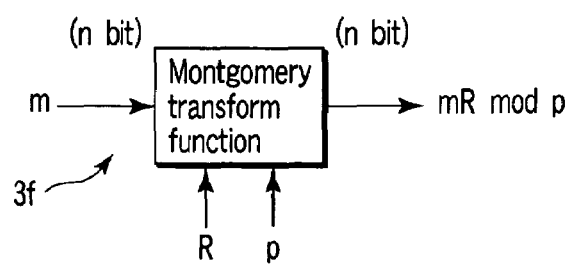
FIG. 6 is a schematic diagram for explaining the conventional Montgomery transform.
Figure 7:
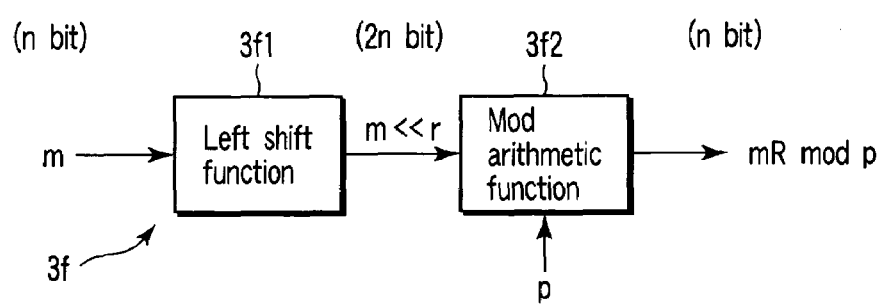
FIGS. 7 and 8 are schematic diagrams showing configurations of the conventional Montgomery transform.
Figure 8:
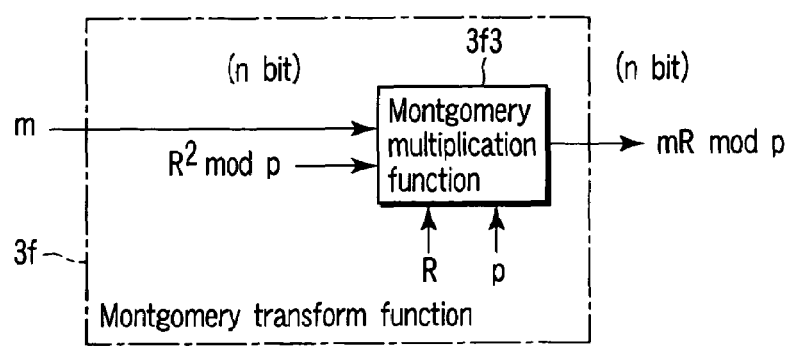

As shown in FIG. 6, the conventional Montgomery transform inputs the input m, the constant R and the modulus p of n-bit and outputs the Montgomery transform result m×R mod p. The conventional Montgomery transform operates as shown in FIG. 7 or FIG. 8. The conventional Montgomery transform shown in FIG. 7 performs direct calculation by a left shift function to make a left shift of the input m and a mod arithmetic function 3f2 to acquire a remainder under the modulus p of the input m which is made the left shift. A symbol r indicates the number of bits of the multiplier R. The conventional Montgomery transform shown in FIG. 8 is calculated by a Montgomery multiplication function 3f3 of the input m of n-bit by the square of the constant R $R^2$ mod p. The square of the constant R $R^2$ mod p is calculated in advance.

In any event, the conventional Montgomery transform can treat only inputs of n-bit as shown in FIGS. 6 to 8, so that the conventional Montgomery transform requires mod arithmetic unit 1 to reduce the bit numbers of the input m from 2n-bit to n-bit in the input stage.

On the other hand, the Montgomery transform device 10 regarding the first embodiment can obtain the Montgomery transform result of n-bit from the input m of 2n-bit while omitting the division in the input stage, as stated above.

Second Embodiment

Figure 9:
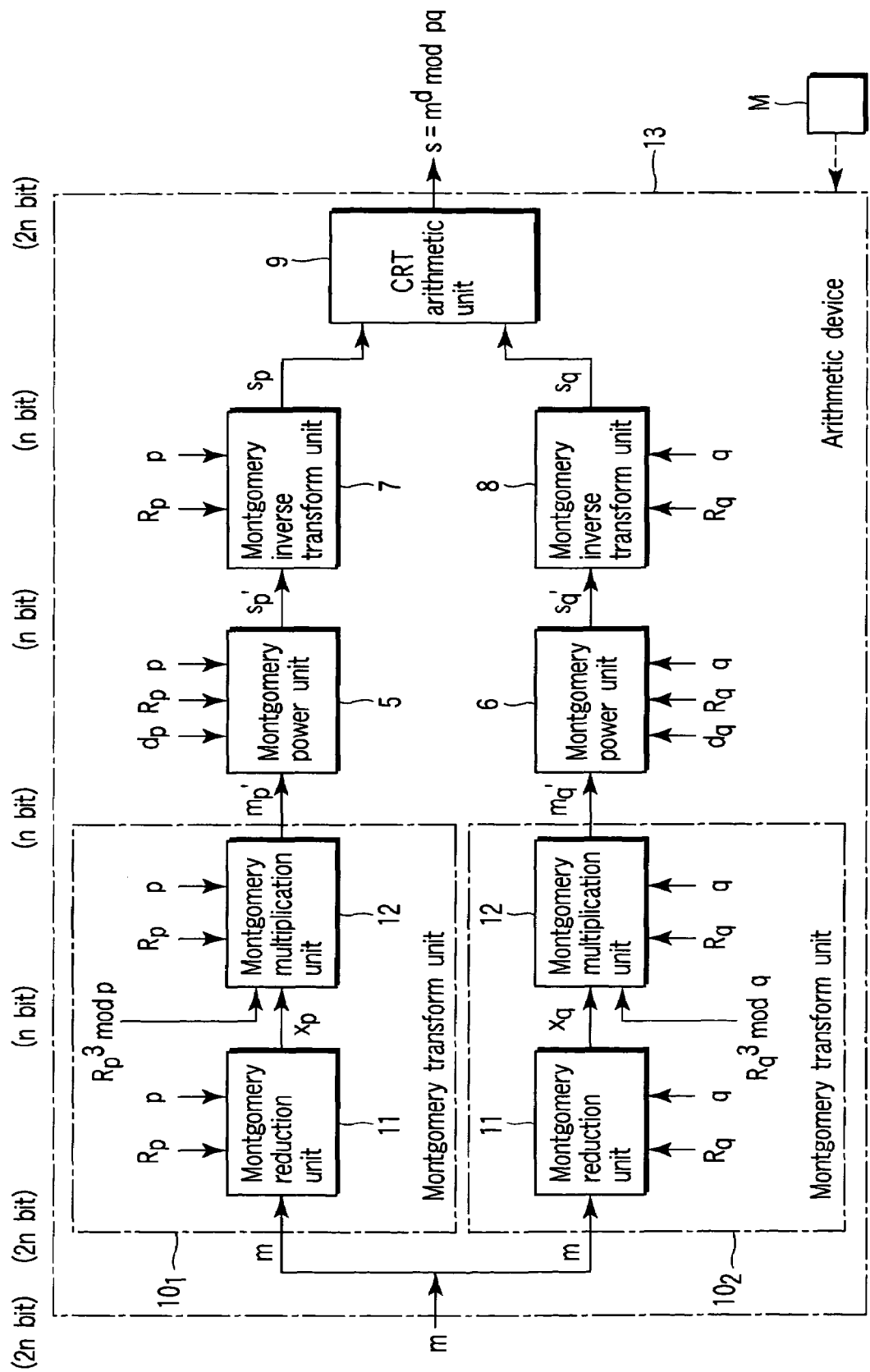
FIG. 9 is a schematic diagram showing a configuration of an arithmetic device regarding a second embodiment of the invention.

FIG. 9 is the schematic diagram showing the configuration of the arithmetic device regarding the second embodiment of the invention.

The second embodiment related to an arithmetic device 13 having Montgomery transform units $10_1$ and $10_2$ with the same configuration that of the Montgomery transform device 10 shown in FIG. 2 instead of the mod arithmetic units 1 and 2 and the Montgomery transform units 3 and 4 shown in FIG. 1.

Where, Montgomery transform units $10_1$ and $10_2$ respectively have the Montgomery reduction units 11 and 12.

The rest of the second embodiment, which are Montgomery power units 5 and 6, the Montgomery inverse transform units 7 and 8, and the CRT arithmetic unit 9, are as described above. However, respective arithmetic in the Montgomery reduction, the Montgomery power, the Montgomery inverse transform, the CRT arithmetic, etc., will be simply explained by referring the case of the modulus p. It is obvious that the case of the modulus q can be calculated similarly. The details of respective arithmetic are described in "Handbook of applied cryptography".

Figure 10:
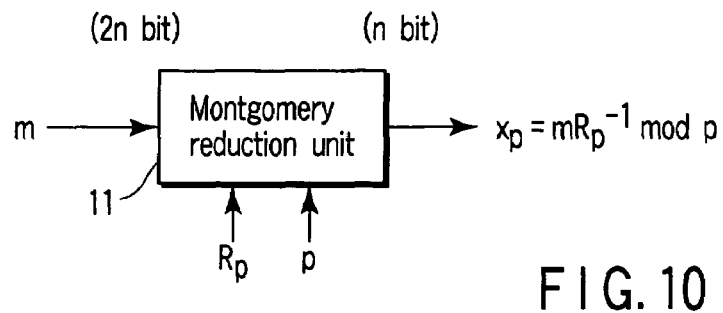
FIG. 10 is a schematic diagram showing a configuration of a Montgomery reduction unit in the second embodiment.

The Montgomery reduction unit 11, as shown in FIG. 10, does not use division and use the Montgomery reduction to calculate an output $x_p = m \times R^{-1}$ mod p of n-bit from the input m of 2n-bit. An efficient calculation method for the Montgomery reduction using the multiple length arithmetic is described in detail in "Handbook of applied cryptography" mentioned above.

Figure 11:
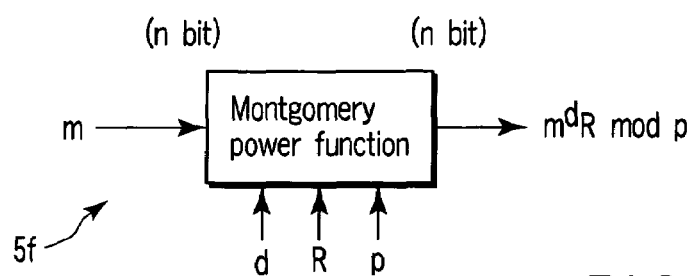
FIG. 11 is a schematic diagram for explaining a general Montgomery power function.
Figure 12:
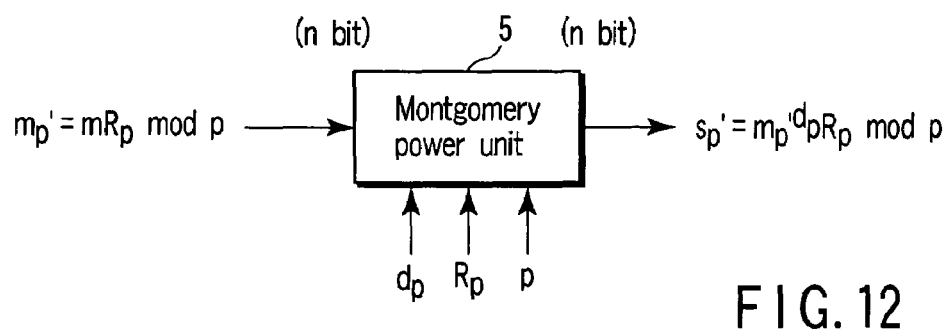
FIG. 12 is a schematic diagram showing a configuration of a Montgomery power unit in the second embodiment.

As shown in FIG. 11, the Montgomery power unit 5 has a Montgomery power function 5f to calculate an output $m^d \times R$ mod p of n-bit to the input m of n-bit. Where, the Montgomery power unit 5, as shown in FIG. 12, performs the $d_p$-th power [however, $d_p$=d mod (p−1)] against the Montgomery multiplication result $m_p$' from the Montgomery multiplication unit 12 to obtain a power remainder $s_p{}'$ ($=m_p{}'^{d_p} \times R_p$ mod p), based on the power exponent d, the multiplier $R_p$ and the modulus p.

Figure 13:
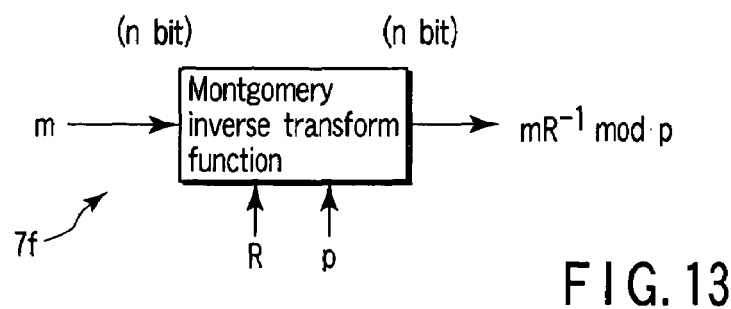
FIG. 13 is a schematic diagram for explaining a general Montgomery inverse transform function.
Figure 14:
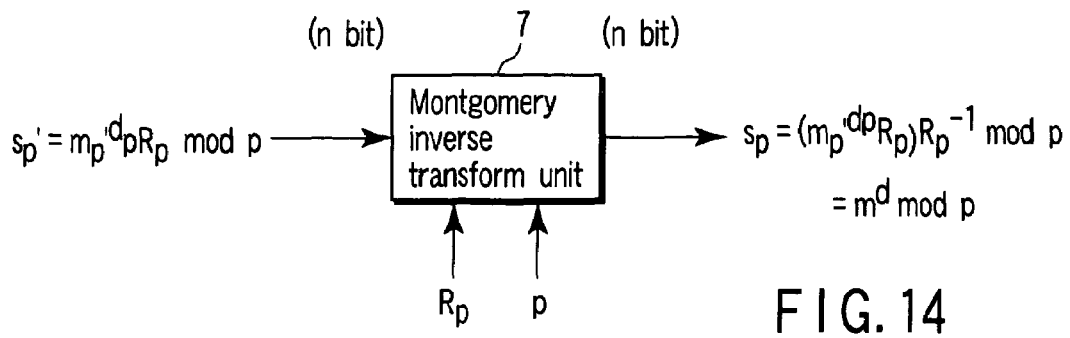
FIG. 14 is a schematic diagram showing a configuration of a Montgomery inverse transform unit regarding the second embodiment.

As shown in FIG. 13, the Montgomery inverse transform unit 7 has a Montgomery inverse transform function 7f to transform the input m of n-bit into an output $m \times R^{-1}$ of n-bit. Where, as shown in FIG. 14, the Montgomery inverse transform unit 7 executes the Montgomery inverse transform to the power remainder $s_p{}'$ from the Montgomery power unit 5 on the basis of the power exponent d, the multiplier $R_p$ and the modulus p and obtains a Montgomery inverse result $s_p$ ($=m^d$ mod p) of n-bit.

Processes of the Montgomery inverse transform is mentioned in detail here.

$$S_p = S'_p R_p^{-1} \bmod p$$
$$= (m'_p \wedge d_p R_p) R_p^{-1} \bmod p$$
$$= m'_p \wedge d_p R_p^{-1} \bmod p$$
$$= m \wedge d_p R_p \wedge d_p R_p \wedge -(dp-1) R_p^{-1} \bmod p$$
$$= m \wedge d_p \bmod p$$
$$= m^d \bmod (p-1) \bmod p$$
$$= m^{k(p-1)+d} \bmod p$$
$$= (m^{p-1})^k m^d \bmod p$$
$$= m^d \bmod p$$

Where, k is an arbitrarily integer, and an equation $m^{p-1} \equiv 1$ mod p is the Fermat's little theorem.

Figure 15:
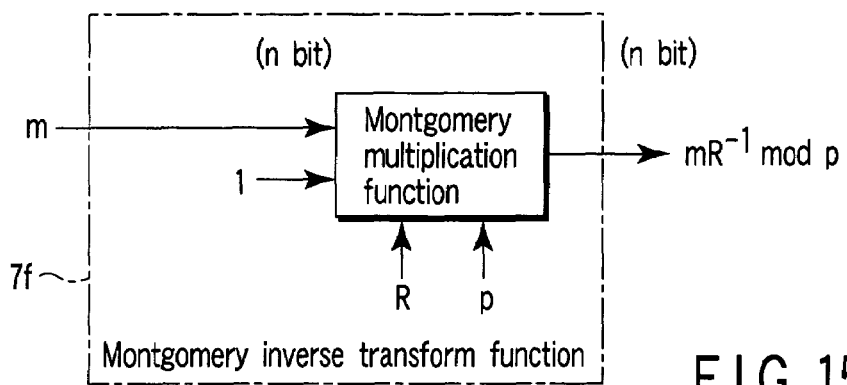
FIG. 15 is a schematic diagram showing a configuration of a general Montgomery inverse transform function.

As shown in FIG. 15, the Montgomery inverse function 7f can be realized by a Montgomery multiplication function to multiply the input m by one.

Figure 16:
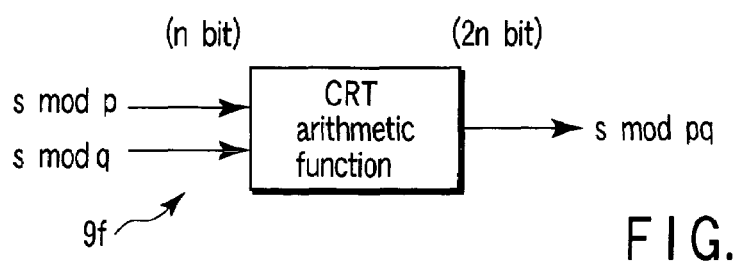
FIG. 16 is a schematic diagram for explaining a general CRT arithmetic function.
Figure 17:
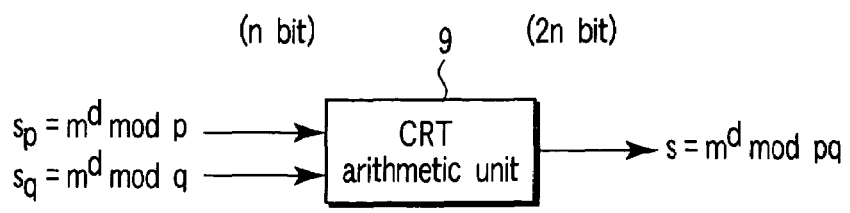
FIG. 17 is a schematic diagram showing a configuration of a CRT arithmetic unit in the second embodiment.

The CRT arithmetic unit 9, as shown in FIG. 16, has a CRT arithmetic function 9f to calculate a mod pq of 2n-bit on the basis of two n-bit inputs of (s mod p) and (s mod q), based on the CRT. Here, as shown in FIG. 17, the CRT arithmetic unit 9 solves the simultaneous equations of the Montgomery inverse transform results $s_p$ and $s_q$ output from the two Montgomery inverse transform units 7 and 8 on the basis of the moduli p and q and the CRT, respectively, and outputs the obtained solution ($m^d$ mod pq) of n-bit as a power remainder s.

Next, operations of the arithmetic device constituted as stated above will be explained.

The arithmetic device 13 performs the Montgomery reduction to each input m of 2n-bit by means of each Montgomery reduction unit 11, respectively. At this time, one Montgomery reduction unit 11 executes the Montgomery reduction to the input m of 2n-bit in accordance with the multiplier R not less than n-bit and the modulus p of n-bit and outputs the obtained Montgomery reduction result $x_p$ ($=mR^{-1}$ mod p) on n-bit to the Montgomery multiplication units 12. In similarity, the other Montgomery reduction unit 11 executes the Montgomery reduction to the input m of 2n-bit in accordance with the multiplier R not less than n-bit and the modulus q of n-bit and outputs the obtained Montgomery reduction result $x_q$ ($=mR^{-1}$ mod q) on n-bit to the Montgomery multiplication units 12.

Then, one Montgomery multiplication unit 12 performs the Montgomery multiplication of the Montgomery reduction result $X_p$ by the multiplier ($R_p{}^3$ mod p) and outputs the obtained Montgomery multiplication result $m_p{}'$ ($=m \times R_p$ mod p) to the Montgomery multiplication unit 5. In similarity, the other Montgomery multiplication unit 12 performs the Montgomery multiplication of the Montgomery reduction result $X_q$ by the multiplier ($R_q^3$ mod q) and outputs the obtained Montgomery multiplication result $m_q'$ ($=m \times R_q$ mod q) to the Montgomery power unit 6.

Each Montgomery multiplication results $m_p'$ and $m_q'$ respectively coincide with the outputs from the conventional Montgomery transform units 3 and 4 shown in FIG. 1. In the calculation so far, the division is not used.

Hereinafter, as shown in FIG. 1, the arithmetic device calculates the power remainder $s = m^d$ mod pq on the basis of the CRT through the Montgomery power and the Montgomery inverse transform.

As mentioned above, according to the second embodiment, since the configuration for obtaining the Montgomery transform result of n-bit from the input m of 2b-bit by using the Montgomery reduction and the Montgomery multiplication instead of the conventional mod arithmetic and the Montgomery transform is provided in the input stage of the power remainder calculation, the arithmetic device 13 can execute the power remainder calculation with the CRT and the Montgomery arithmetic are combined therein while omitting the division in the input stage.

In supplement, the arithmetic device 13 in the second embodiment can realize efficient mounting by combining the CRT and the Montgomery arithmetic even if the division is not present in the input state, thereby, the circuit size can be miniaturized and the arithmetic speed can be accelerated. The division is arithmetic in which running time and processing is varied due to an input, so that the division has a fault to be weak against side channel attack. However, the arithmetic device 13 regarding the second embodiment does not use the division, consequently, it can improve security against the side channel attack.

Third Embodiment

Figure 18:
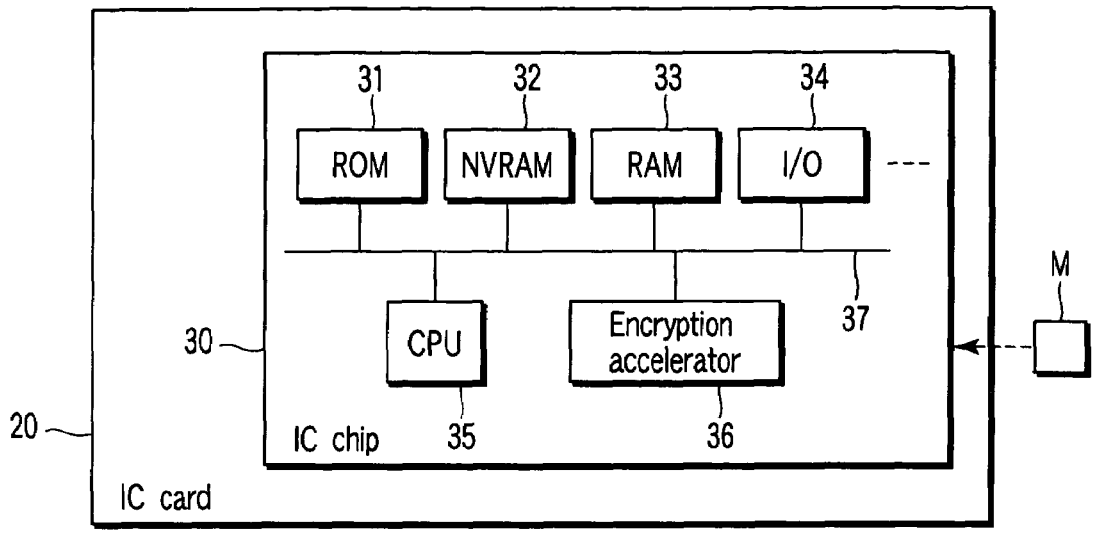
FIG. 18 is a schematic diagram showing a configuration of an IC card regarding a third embodiment of the invention.

FIG. 18 is the schematic diagram showing the IC card regarding the third embodiment of the invention. This IC card 20 has an IC chip 30.

In the IC chip 30, a ROM 31, an NVRAM 32, a RAM 33, I/O 34, a CPU 35 and an encryption accelerator 36 are connected one another thorough a bus 37. A hardware structure other than the encryption accelerator 36 is the same as that of a usual computer. The arithmetic device 13 is mounted as the encryption device (accelerator) 36, however, it is not limited to this structure and acceptable to be mounted as a combination of the encryption accelerator 36 and one function of the CPU 35.

Figure 19:
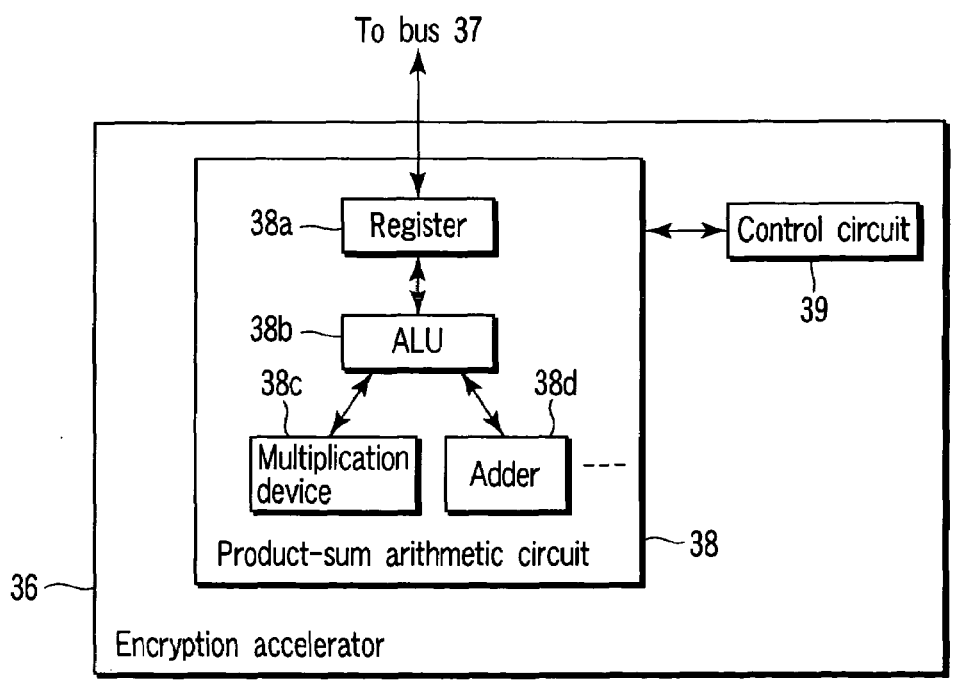
FIG. 19 is a schematic diagram showing a configuration of an encryption accelerator regarding the third embodiment.

The encryption accelerator (coprocessor) 36 is an arithmetic device to make encryption processing efficient and, as shown as FIG. 19, has a product-sum arithmetic circuit 38 and a control circuit 39.

The product-sum arithmetic circuit 38 is composed of a plurality of arithmetic unit such as a register 38a, an ALU (arithmetic and logical unit) 38b, a multiplication device 38c and an adder 38d, and has a function to calculate the power remainder ($m^d$ mod pq) of n-bit from the input m of 2n-bit input from the bus 37 in accordance with control from the control circuit 39.

The control circuit 39 controls the product-sum arithmetic circuit 38 so as to execute a series of power remainder calculations composed of the Montgomery reduction, the Montgomery multiplication, the Montgomery power, the Montgomery inverse transform and the CRT arithmetic stated in the second embodiment. The series of the power remainder calculations can be realized by the combination of arithmetic by means of the multiplication device 38c, the adder 38d, etc.

Next, operations of the IC card configured as described above are explained below.

In the IC card 20, it is assumed that the power remainder ($m^d$ mod pq) is required to be calculated for arithmetic object data m during processing of some kind in the CPU 35. The processing of some kind means, for example, encryption processing, decryption processing, signature generation processing, signature verification processing or the like.

The CPU 35 inputs the arithmetic object data m of 2n-bit into the encryption accelerator 36. In the encryption accelerator 36, the product-sum arithmetic circuit 38 executes a series of power remainder calculations to the input m of 2n-bit in accordance with the control from the control circuit 39.

At this moment, the control circuit 39 controls an input stage of the power remainder calculation using the CRT so as to obtain the Montgomery transform result of n-bit from the input m of 2n-bit by using the Montgomery reduction and the Montgomery multiplication.

Therefore, the encryption accelerator 36 can execute the power remainder calculation with the combination of the CRT and the Montgomery arithmetic while omitting the division in the input stage. The encryption accelerator 36 writes the obtained power remainder ($m^d$ mod pq) power remainder of n-bit into the RAM 32 through the bus 37.

The CPU 35 continues processing by using the power remainder in the RAM 32.

As mentioned above, according to the third embodiment, since the IC chip 30 is provided with the encryption accelerator 36 to execute the power remainder calculation described in relation to the second embodiment, the third embodiment can achieve the IC card 20 bring about the effect of the second embodiment.

The third embodiment needs not to be limited to the control from the control circuit 39, and it is sufficient for the third embodiment to be configured to make the CPU 35 control the power remainder calculation to be done by the encryption accelerator 36. Even such a modification has made, the third embodiment can realize the IC card for obtaining the effect of the second embodiment as stated above.

Fourth-Sixth Embodiments

The fourth-sixth embodiments will be explained as follows. The fourth-sixth embodiments are examples of the third embodiment, in which the processing under the processing of the CPU 35 are defined as RSA signature processing, RSA decryption processing or DSA signature processing. Sequential explanation about them will be given below.

Fourth Embodiment

The fourth embodiment relates to the IC card 20 having the encryption accelerator 36 and executing the RSA signature processing to document data D of a signature object by using a private key d of the RSA signature system.

The IC card 20 has the ROM 31 with the program to make the CPU 35 execute the following functions 35/1-35/a stored thereon.

(35/1): A function of calculating a one-way hash function of document data D to obtain a hash value h(D) when executing the RSA encryption processing.

(35/2): A function of inputting the hash value h(D) as the input m into the encryption accelerator 36 and inputting the private key d as the power exponent d into the encryption accelerator 36.

(35/3): A function of inputting the power exponent d, and then, storing the power remainder s output from the encryption accelerator 36 as the RSA signature s [=h(D)$^d$ mod pq] into the NVRAM 32.

(35/4): A function of outputting the RSA signature to an external computer, etc., through the I/O 34.

According to such a foregoing configuration, the CPU 35 makes the encryption accelerator 36 execute the power remainder calculation for the hash value h(D), thereby, the fourth embodiment can achieve the IC card 20 to bring about the effect of the second embodiment in the RSA signature processing.

Fifth Embodiment

The fifth embodiment relates to the IC card 20 having the foregoing encryption accelerator 36 and executing the RSA decryption processing by using a private key d being a key pair of a public key e to an encrypted text c (=D$^e$ mod pq) in which plaintext data D is encrypted by using the public key e of the RSA decryption processing.

The IC card 20 has the ROM 31 with the program to make the CPU 35 execute the following functions 35/11-35/14 stored thereon.

(35/11): A function of inputting the encrypted text c as the input m into the encryption accelerator 36 and inputting the private key d as a power exponent d into the encryption accelerator 36 when executing the RSA decryption processing.

(35/12): A function of storing the power remainder s output from the encryption accelerator 36 as the RSA decryption result s (=c$^d$ mod pq) into the NVRAM 32 after inputting the input m and the private key d.

(35/13): A function of outputting the RSA decryption result s to the external computer, etc., through the I/O 34.

According to such the configuration, when the RSA decryption proceeding is performed, the CPU 35 makes the encryption accelerator 36 execute the power remainder calculation for the encrypted text c, so that the fifth embodiment can achieve the IC card 20 to bring about the effect of the second embodiment in the RSA decryption processing.

Sixth Embodiment

The sixth embodiment relates to the IC card having the foregoing encryption accelerator 36 and executing the DSA signature processing to the document data D to be signed on the basis of a public key g and a private key x of the DSA signature system.

The IC card 20 has the ROM 31 with the program to make the CPU 35 execute the following functions 35/21-35/28 stored thereon.

(35/21): A function of selecting at random a random number k from a multiplication group $z_q$* of the modulus q when executing the DSA signature processing.

(35/22): A function of inputting the public key g as the input m into the encryption accelerator 36 and inputting the random number k as the power exponent d into the encryption accelerator 36.

(35/23): A function of controlling the encryption accelerator 36 after inputting the public key g and the random number k function so as to function as one Montgomery transform unit 10$_1$, the Montgomery power unit 5 and the Montgomery inverse transform unit 7.

(35/24): A function of generating first part data r [=(g$^k$ mod p) mod q] of the DAS signature on the basis of the power remainder (g$^k$ mod p) output from the encryption accelerator 36 and the modulus q stored in advance.

(35/25): A function of calculating the one-way hash function of the document data D and obtaining the hash value h(D).

(35/26): A function of executing the DSA signature processing on the basis of the random number k, the hash value h(D), the private key x, the first part data r and the modulus q and generating a second part data s [=K$^{-1}$ (h(D)+xr) mod q].

(35/27): A function of storing the first and the second partial data r and s as a DSA signature (r, s) into the NVRAM 32.

(35/28): A function of outputting the DSA signature (r, s) to the external computer, etc., through the I/O 34.

According to such the foregoing configuration, at the time of the DSA signature processing, the CPU 35 makes the encryption accelerator 36 execute the power remainder calculation for the encrypted text c, thereby, the sixth embodiment can achieve the IC card 20 to bring about the effect of the second embodiment in the DSA signature processing.

Seventh and Eighth Embodiments

The seventh and the eighth embodiments of the invention will be explained by referring FIGS. 20 and 21.

The seventh and eighth embodiments are respectively specific examples and modified examples of the third embodiment, the processing under execution of the CPU 35 are respectively defined as the RSA encryption processing or the RSA decryption processing. However, instead of the IC card 20, an encryption device 20E or a decryption device 20D respectively having IC chips 30 similar to the IC card 20 are achieved as the seventh and eighth embodiments. They are explained as follows.

Seventh Embodiment

Figure 20:
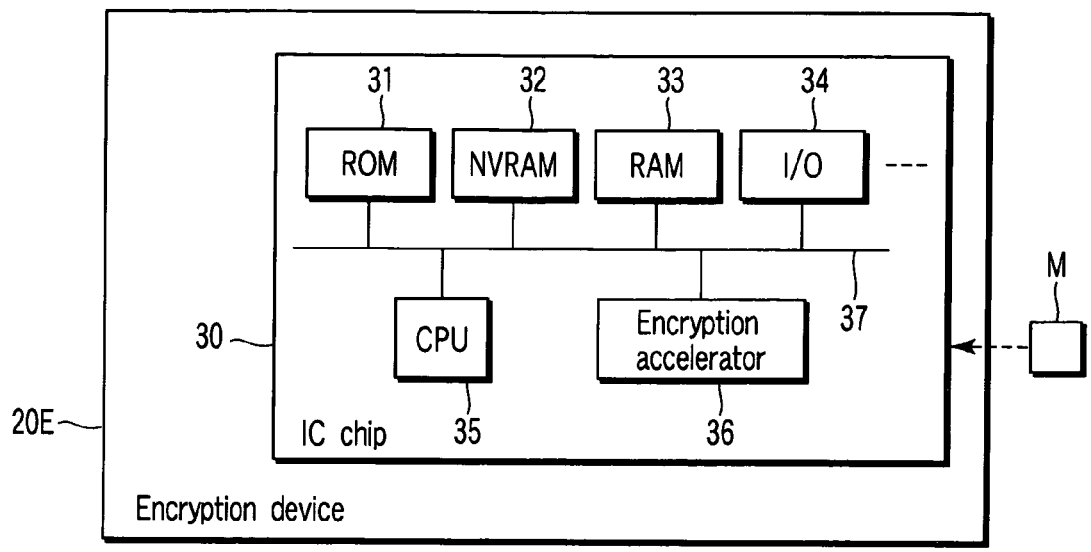
FIG. 20 is a schematic diagram showing a configuration regarding a seventh embodiment of the invention.

As shown in FIG. 20, the seventh embodiment related to the encryption device 20E having the foregoing encryption accelerator 36 and executing the RSA encryption processing to the plaintext data D to be encrypted, based on the public key e in the RSA encryption system.

Where, the encryption device 20E has the ROM 31 with the program to make the CPU 35 execute the following functions 35/31-35/33 stored therein.

(35/31): A function of inputting the plaintext data D as the input m into the encryption accelerator 36 and inputting the public key e as the power exponent d into the encryption accelerator 36, when executing the RSA encryption processing.

(35/32): A function of storing the power remainder output from the encryption accelerator 36 as the RSA encrypted text c (=D$^e$ mod pq), after inputting the input m and the power exponent d.

(35/33): A function of outputting the RSA encrypted text c to the external computer, etc., through the I/O 34.

According to such the configuration described above, at the time of the RSA encryption processing, the CPU 35 makes the encryption accelerator 36 execute the power remainder calculation for the plaintext data D, so that the seventh embodiment can achieve an encryption device to bring about the effect of the second embodiment.

Eighth Embodiment

Figure 21:
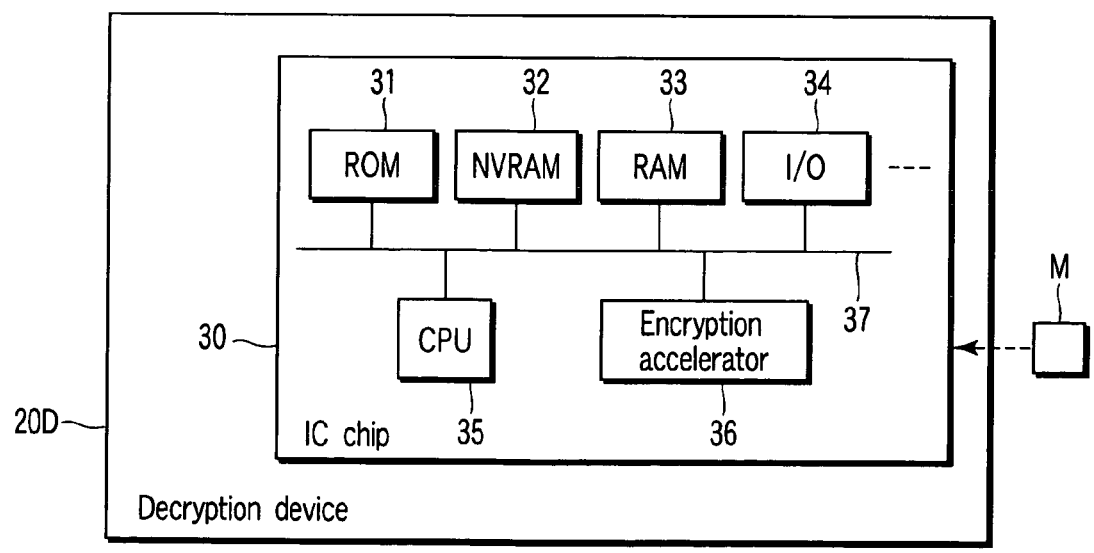
FIG. 21 is a schematic diagram showing a configuration regarding an eighth embodiment of the invention.

As shown in FIG. 21, the eight embodiment relates to the decryption device 20D having the foregoing encryption accelerator 36 and executing the RSA decryption processing to the encrypted text c (=D$^e$ mod pq) in which the plaintext data D is encrypted by using the public key e of the RSA encryption system by using the private key d being the key pair of the public key e.

Where, the decryption device 20 D has the ROM 31 with the program to make the CPU 35 execute the following functions 35/41-35/43 stored therein.

(35/41): A function of inputting the encrypted text c as the input m into the encryption accelerator 36 and inputting the private key as the power exponent d into the encryption accelerator 36, when executing the RSA decryption processing.

(35/42): A function of storing the power remainder output from the encryption accelerator 36 as the RSA decryption result s (=c$^d$ mod pq) into the NVRAM 32, after inputting the input m and the power exponent d.

(35/43): A function of outputting the RSA decryption result s to the external computer, etc., through the I/O 34.

According to such the configuration mentioned above, since the CPU 35 makes the encryption accelerator 36 the power remainder calculation for the encrypted text c, the eighth embodiment can realize the decryption device to bring about the effect of the second embodiment in the RSA decryption processing.

Note that the techniques described in the above-described respective embodiments are stored as programs which can be executed by computers in recording media such as magnetic disks (floppy (registered trademark) disks, hard disks, and the like), optical disks (CD-ROM/DVD and the like), optical magnetic disks (MO), semiconductor memories, and the like, and can be distributed.

Further, as the recording media, recording media which can store programs therein and out which computers can read may have any form of the storing system.

Further, middle ware (MW) or the like such as operating system (OS), database management software, network software, or the like, which is working on a computer on the basis of an instruction of the program installed in the computer from the storage medium may execute some of the respective processings for realizing the present embodiment.

Moreover, the recording media in the present invention are not limited to media independent of the computer, and recording media in which a program transmitted by LAN, Internet, or the like is downloaded, and stored or temporarily stored are included therein.

Further, the storage medium is not limited to one, and a case where the processings in the present embodiment are executed from a plurality of media is included in the storage medium in the present invention, and the medium configuration may be any configuration.

Note that, the computer in the present invention is to execute the respective processings in the present embodiment on the basis of the program stored in the storage medium, and may be any configuration of an apparatus formed from one such as a personal computer, a system in which a plurality of apparatuses are connected through a network, and the like.

Note that the computer in the present invention is not limited to a personal computer, and includes an arithmetic processing device, a microcomputer, and the like included information processing equipment, and is general term for equipment/apparatus which can realize the functions of the present invention by the program.

Note that the present invention is not limited to the above-described embodiments are as, and structural requirements can be modified and materialized within a range which does not deviate from the gist of the present invention at the practical phase. Further, various inventions can be formed due to the plurality of structural requirements which have been disclosed in the above-described embodiments being appropriately combined. For example, several structural requirements may be eliminated from all of the structural requirements shown in the embodiments. Moreover, structural requirements over different embodiments may be appropriately combined.

What is claimed is:

1. A Montgomery transform device for obtaining a Montgomery transform result m' (=mR mod p) of n-bit from an input m of 2n-bit on the basis of a multiplier R not less than n-bit and a modulus p of n-bit; comprising:

a Montgomery reduction device configured to execute Montgomery reduction composed of multiplication, addition and a bit shift to the input m of 2n-bit on the basis of the modulus p and the multiplier R and obtain a Montgomery reduction result (mR$^{-1}$ mod p) of n-bit; and a Montgomery multiplication device configured to execute Montgomery multiplication of the Montgomery reduction result (mR$^{-1}$ mod p) by the cube of the multiplier R (R$^3$ mod p) on the basis of the multiplier R and the modulus p and output the obtained Montgomery multiplication result (mR mod p) of n-bit as the Montgomery transform result m' (=mR mod p).

2. An arithmetic device for calculating the d-th power under a modulus pq to an input m of 2n-bit on the basis of multipliers $R_p$ and $R_q$ not less than n-bit, moduli p and q of n-bit and a power exponent d of n-bit to obtain a power remainder s (=m$^d$ mod pq) of n-bit, comprising:

a first Montgomery reduction device configured to execute Montgomery reduction composed of multiplication, addition and a bit shift to the input m of 2n-bit on the basis of the multiplier $R_p$ and the modulus p and obtain a first Montgomery reduction result (mR$_p^{-1}$ mod p) of n-bit; and a first Montgomery multiplication device configured to execute Montgomery multiplication of the first Montgomery reduction result by the cube of the multiplier $R_p$ ($R_p^3$ mod p) on the basis of the multiplier $R_p$ and the modulus p and obtain a first Montgomery multiplication result mp' (=m$R_p$ mod p) of n-bit;

a first Montgomery power device configured to perform the $d_p$-th power of the first Montgomery multiplication result $m_p$' [$d_p$=d mod(p−1)] on the basis of the power exponent d, the multiplier $R_p$ and the modulus p and obtain a first power remainder $s_p$' (=$m_p$'^$d_p$×$R_p$ mod p) of n-bit;

a first Montgomery inverse transform device configured to execute Montgomery inverse transform to the first power remainder $s_p$' on the basis of the multiplier $R_p$ and the modulus p and obtain a first Montgomery inverse transform result $s_p$ (=m$^d$ mod p) of n-bit;

a second Montgomery reduction device configured to execute Montgomery reduction composed of multiplication, addition and a bit shift to the input m of 2n-bit on the basis of the multiplier $R_q$ and the modulus q and obtain a second Montgomery reduction result (mR$_q^{-1}$ mod q) of n-bit;

a second Montgomery multiplication device configured to execute Montgomery multiplication of the second Montgomery reduction result by the cube of the multiplier $R_q$ ($R_q^3$ mod q) on the basis of the multiplier $R_q$ and the modulus q and obtain a second Montgomery multiplication result $m_q$' (=m$R_q$ mod q) of n-bit;

a second Montgomery power device configured to perform the $d_q$-th power of the second Montgomery multiplication result $m_q'$ of n-bit [$d_q$=d mod(q−1)] on the basis of the power exponent d, the multiplier $R_q$ and the modulus q and obtain a second power remainder $s_q'$=$m_q'^{\,r}d_q \times R_q$ mod q) of n-bit;

a second Montgomery inverse transform device configured to execute Montgomery inverse transform to the second power remainder $s_q'$ on the basis of the multiplier $R_q$ and the modulus q and obtain a second Montgomery inverse transform result $s_q$ (=$m^d$ mod q) of n-bit; and a simultaneous equations solution device configured to solve simultaneous equations of the first Montgomery inverse transform result $s_p$ and the second Montgomery inverse transform result $s_q$ on the basis of the moduli p, q and the Chinese remainder theorem (CRT) and output the obtained solution ($m^d$ mod pq) of n-bit as the power remainder s.

3. An IC card having the arithmetic device according to the claim 2 and executing RSA signature processing to text data D to be signed by using a private key of an RSA signature system, the IC card comprising:

a Hash calculation device configured to calculate a one-way hash function of the text data D and obtain hash value h(D);

a first input device configured to input the hash value h(D) as the input m to the arithmetic device;

a second input device configured to input the private key d as a power exponent d to the arithmetic device; and a signature output device configured to output a power remainder s output from the arithmetic device, as an RSA signature s [=h(D)$^d$ mod pq], after inputting from the first and the second input devices.

4. An IC card having the arithmetic device according to claim 2 and executing RSA decryption processing to encrypted text c (=$D^e$ mod pq), in which plaintext data D is encrypted by using a public key e of an RSA encryption system, by using a private key d being a pair key of the public key e, the IC card comprising:

a first input device configured to input the encrypted text c as the input m to the arithmetic device when executing the RSA decryption processing;

a second input device configured to input the private key d as a power exponent d to the arithmetic device; and a decryption result output device configured to output a power remainder s output from the arithmetic device, as an RSA decryption result s (=$c^d$ mod pq) after inputting by the first and the second input devices.

5. An IC card having the arithmetic device according to claim 2 and executing DSA signature processing to text data D to be signed on the basis of a public key g and a private key x of a DSA signature system, the IC card comprising;

a random selecting device configured to select a random number k from a multiplication group $z_q^*$ of a modulus q when executing the RSA decryption processing;

a first input device configured to input the public key g as an input m to the first Montgomery reduction device;

a second input device configured to input the random number k as a power exponent d to the first Montgomery reduction device;

a first part data generation device configured to generate first part data r [=($g^k$ mod p) mod q] of a DSA signature on the basis of a power remainder ($g^k$ mod p) output from the first Montgomery inverse transform device and a modulus q stored in advance, after inputting by the first and the second input devices:

a hash calculation device configured to calculate a one-way hash function of the text data D and obtain a hash value h(D);

a signature execution device configured to execute the USA signature processing on the basis of the random number k, the hash value h(D), the private key x, the first part data r and the modulus q and generate second part data s {=$k^{-1}$ [h(D)+xr] mod q} of the DSA signature; and a signature output device configured to output the first and the second part data r and s as a DSA signature (r, s).

6. An encryption device having the arithmetic device according to claim 2 to execute RSA encryption processing to plaintext data D to be encrypted on the basis of a public key e of an RSA encryption system, the encryption device comprising:

a first input device configured to input the plaintext data D as an input m to the arithmetic device when executing the RSA decryption processing;

a second input device configured to input the public key e as a power exponent d to the arithmetic device; and an encrypted text output device configured to output a power remainder s as RSA encrypted text c (=$D^e$ mod pq) output from the arithmetic device after inputting by the first and the second input devices.

7. A decryption device having the arithmetic device according to claim 2 and executing RSA decryption processing to encrypted text c (=$D^e$ mod pq), in which plaintext data D is encrypted by using a public key e of an RSA encryption system, by using a private key being a key pair of the public key e, the decryption device comprising:

a first input device configured to input the encrypted text data c as an input m to the arithmetic device when executing the RSA decryption processing;

a second input device configured to input the public key e as a power exponent d to the arithmetic device; and a decrypted result output device configured to output a power remainder s as an RSA decrypted result s (=$c^d$ mod pq) output from the arithmetic device after inputting by the first and the second input devices.

8. A program stored in a computer readable recording medium for use in a computer of a Montgomery transform device to obtain a Montgomery transform result m' (=mR mod p) of n-bit from input m of 2n-bit on the basis of a multiplier R not less than n-bit and a modulus p of n-bit stored in a memory, the program comprising:

first program code for making the computer sequentially execute Montgomery reduction processing to execute the Montgomery reduction composed of multiplication, addition and a bit shift to an input m of 2n-bit and obtain a Montgomery reduction result (mR$^{-1}$ mod p) of n-bit on the basis of the modulus p and the multiplier R in the memory; and second program code for making the computer sequentially execute Montgomery multiplication processing to execute the Montgomery multiplication of the Montgomery reduction result by the cube of the multiplier R ($R^3$ mod p) on the basis of the multiplier R and the modulus p in the memory and output the obtained Montgomery multiplication result (mR mod p) of n-bit as the Montgomery transform result m'.

9. A program stored in a computer readable recording medium for use in a computer of an arithmetic device for calculating the d-th power under a modulus pq to an input m of 2n-bit on the basis of multipliers $R_p$ and $R_q$ not less than n-bit, moduli p and q of n-bit and an input power exponent d of n-bit to obtain a power remainder s (=$m^d$ mod pq) of n-bit stored in a memory, the program comprising:

first program code for making the computer sequentially execute first Montgomery reduction processing to execute the first Montgomery reduction composed of multiplication, addition and a bit shift to the input m of 2n-bit on the basis of the multiplier R and the modulus p in the memory and obtain a first Montgomery reduction result $(mR_p^{-1} \bmod p)$ of n-bit;

second program code for making the computer sequentially execute first Montgomery multiplication processing to execute the first Montgomery multiplication of the first Montgomery reduction result by the cube of the multiplier R ($R^3 \bmod p$) on the basis of the multiplier R and the modulus p in the memory and obtain a first Montgomery multiplication result mp' ($mR_p \bmod p$);

third program code for making the computer sequentially execute first Montgomery power processing to perform the $d_p$-th power of the first Montgomery multiplication result $m_p$' [wherein, $d_p=d \bmod(p-1)$] on the basis of the power exponent d, the multiplier $R_p$ and the modulus p and obtain a first power remainder $s_p$' ($=m_p{}^{'d_p} \times R_p \bmod p$) of n-bit;

fourth program code for making the computer sequentially execute first Montgomery inverse transform processing to execute the first Montgomery inverse transform to the first power remainder $S_p$' on the basis of the multiplier R and the modulus p in the memory and obtain a first Montgomery inverse transform result $s_p$ ($=m^d \bmod p$) of n-bit on the basis of the multiplier $R_p$ and the modulus p in the memory;

fifth program code for making the computer execute second Montgomery reduction processing to execute the second Montgomery reduction composed of multiplication, addition and a bit shift to the input m on the basis of the multiplier $R_q$ and the modulus q in the memory and obtain a second Montgomery reduction result ($mR_q^{-1} \bmod q$) of n-bit;

sixth program code for making the computer sequentially execute second Montgomery multiplication processing to execute the second Montgomery multiplication of the second Montgomery reduction result by the cube of the multiplier R ($R_q^3 \bmod q$) on the basis of the multiplier Rq and the modulus q in the memory and obtain a second Montgomery multiplication result $m_q$' ($=mR_q \bmod q$) of n-bit;

seventh program code for making the computer sequentially execute second Montgomery power processing to perform the $d_q$-th power of the second Montgomery multiplication result $m_q$' [$d_q=d \bmod(q-1)$] on the basis of the power exponent d, the multiplier $R_q$ and the modulus q and obtain a second power remainder $s_q$' ($=m_q{}^{'d_q}$ H $R_q \bmod q$) of n-bit;

eighth program for making the computer sequentially execute second Montgomery inverse transform processing to execute the second Montgomery inverse transform to the second power remainder $s_q$' on the basis of the multiplier $R_q$ and the modulus q and obtain a second Montgomery inverse transform result $s_q$' ($=m_q{}^{'d_q} \times 'R_q \bmod q$) of n-bit; and ninth program for making the computer sequentially execute power remainder output processing to solve simultaneous equations of the first Montgomery inverse transform result $s_q$ and the second Montgomery inverse transform result $s_q$ on the basis of the moduli p and q and the Chinese remainder theorem (CRT) in the memory and output the obtained solution ($m^d \bmod q$) of n-bit as the power remainder s.

10. A program stored in a computer readable recording medium for use in a computer of an IC card which has an arithmetic device with the program according to claim 9 installed thereon and executes RSA signature processing to text data D to be signed, by using a private key in an RSA signature system, the program comprising:

tenth program code for making the computer sequentially execute hash arithmetic processing to calculate a one-way hash function of the text data D when executing the RSA signature processing;

eleventh program code for making the computer sequentially execute first input processing to input the hash value h(D) as the input m to the arithmetic device;

twelfth program code for making the computer sequentially execute second input processing to input the private key d as a power exponent d to the arithmetic device; and thirteenth program code for making the computer sequentially execute signature output processing to output a power remainder s as an RSA signature s [$=h(D)^d \bmod pq$] output from the arithmetic device after the first and the second input processing.

11. A program stored in a computer readable recording medium for use in a computer of an IC card which has an arithmetic device with the program according to claim 9 installed thereon and executes RSA decryption processing to encrypted text c ($=D^e \bmod pq$), in which plaintext data D is encrypted by using a public key e of an RSA system, by using a private key d being a key pair of the public key e, the program comprising:

tenth program code for making the computer sequentially execute first input processing to input the encrypted text c as the input m to the arithmetic device when executing the RSA decryption processing;

eleventh program code for making the computer sequentially execute second input processing to input the private key d as a power exponent d to the arithmetic device; and twelfth program code for making the computer sequentially execute decryption result output processing to output a power remainder output from the arithmetic device, as an RSA decryption result s ($=c^d \bmod pq$) after the first and the second input processing.

12. A program stored in a computer readable recording medium for use in a computer of an IC card which has an arithmetic device with the program according to claim 9 installed thereon and executes DSA signature processing to text data D to be signed on the basis of a public key g and a private key x of a DSA signature system, the program comprising:

tenth program code for making the computer sequentially execute random number selection processing to select a random number k at random from a multiplication group $Z_q^*$ of a modulus q when executing the DSA signature processing;

eleventh program code for making the computer for sequentially executing first input processing to input the public key g as the input m to first Montgomery reduction processing of the arithmetic device;

twelfth program code for making the computer for sequentially execute second input processing to input the random number k as a power exponent d to first Montgomery power processing of the arithmetic device;

thirteenth program code for making the computer sequentially execute first part data generation processing to generate first part data r ($=(g^k \bmod p) \bmod g$] of a DSA signature on the basis of a power remainder ($g^k \bmod p$) output from first Montgomery inverse transform processing of the arithmetic device and a modulus q stored in advance after the first and the second processing;

fourteenth program code for making the computer sequentially execute hash arithmetic processing to calculate a one-way hash function of the text data D and obtain a hash value h(D);

fifteenth program code for making the computer sequentially execute second part data generation processing to execute DAS signature processing on the basis of the random number k, the hash value h(D), the private key x, the first part data r and the modulus q and generate second part data s $\{k^{-1} [h(D)+xr] \bmod q\}$ of the DSA signature; and sixteenth program code for making the computer sequentially execute signature output processing to output the first and the second part data r and s as a DSA signature (r, s).

13. A program stored in a computer readable recording medium for use in a computer of an encryption device which has an arithmetic device with the program according to claim 9 installed thereon and executes RSA encryption processing to text data D to be signed on the basis of a public key e and a private key of an RSA encryption system, the program comprising:

tenth program code for making the computer sequentially execute first input processing to input the plaintext data D as the input m to the arithmetic device when executing the RSA encryption processing;

eleventh program code for making the computer sequentially execute second input processing to input the public key e as a power exponent d to the arithmetic device; and twelfth program code for making the computer sequentially execute encrypted text output processing to output a power remainder output from the arithmetic device, as RSA encrypted text c ($=D^e \bmod pq$) after the first and the second input processing.

14. A program stored in a computer readable recording medium for use in a computer of a decryption device which has an arithmetic device with the program according to claim 9 installed thereon and executes RSA decryption processing to encrypted text c ($=D^e \bmod pq$), in which plaintext data D is encrypted by using a public key e in an RSA system, by using a private key d being a key pair of the public key e, the program comprising:

tenth program code for making the computer sequentially execute first input processing to input the encrypted text c as the input m to the arithmetic device when executing the RSA decryption processing;

eleventh program code for making the computer sequentially execute second input processing to input the private key d as a power exponent d to the arithmetic device; and twelfth program code for making the computer sequentially execute decryption result output processing to output a power remainder s output from the arithmetic device, as an RSA decryption result s ($=c^d \bmod pq$) after the first and the second input processing.

* * * * *